Sept. 19, 1939.   E. W. SEEGER ET AL   2,173,378
RELAY
Filed June 18, 1936

Inventors
Edwin W. Seeger
Glendon C. Brown
Frank J. Russell

By Frank W. Hubbard
Attorney

Patented Sept. 19, 1939

2,173,378

UNITED STATES PATENT OFFICE 2,173,378

RELAY

Edwin W. Seeger, Glendon C. Brown, and Frank J. Russell, Wauwatosa, Wis., assignors to Cutler-Hammer, Inc., Milwaukee, Wis., a corporation of Delaware Application June 18, 1936, Serial No. 85,892

10 Claims. (Cl. 200—94)

This invention relates to relays particularly advantageous for use as voltage relays in alternating current circuits.

An object of the invention is to provide a relay which will be sensitive to a very slight change in excitation and which will be very reliable in operation.

Another object is to provide a relay which will be not only very sensitive but which at the same time will have a sufficiently high inertia to be immune to sudden fluctuations in excitation of very short duration and to mechanical shocks.

Other objects and advantages of the invention will hereinafter appear.

The accompanying drawing illustrates one embodiment of the invention which will now be described, it being understood that such embodiment is susceptible of various modifications without departing from the scope of the appended claims.

Figure 1:
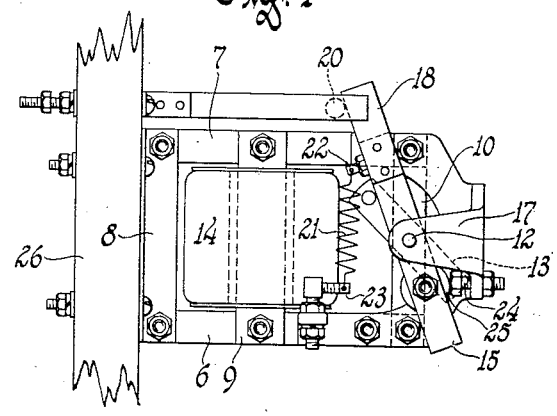
Figure 1 is a side view of the relay.
Figure 2:
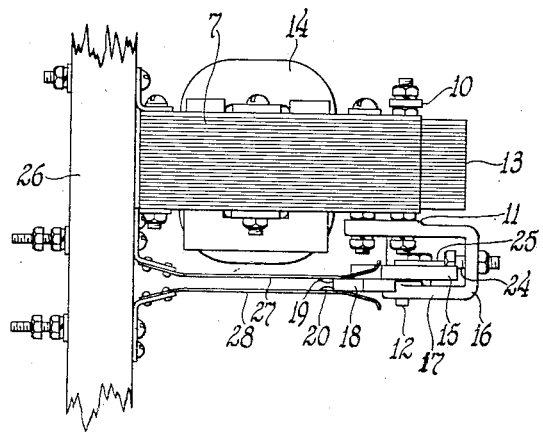
Fig. 2 is a front view of the relay.

Referring to Figs. 1 and 2 which show a relay suitable for alternating current circuits, the relay comprises a laminated iron magnet frame having parallel horizontal members 6 and 7, a vertical end member 8 connecting members 6 and 7 at their extremities, and a vertical member 9 which connects members 6 and 7 intermediate of their extremities and which has a larger iron section than the members 6, 7 and 8. These members are bolted together and the free ends of members 6 and 7 have bolted thereto in a spaced relation therewith a strap 10 and a member 11 which support a shaft 12 upon which is fixed a laminated armature member 13. The shaft 12 passes through the armature member substantially midway between the extremities of the latter and supports it for rotary or oscillatory movement.

The magnet frame described carries an exciting winding 14 which is mounted on member 9, said member serving as a core for said winding. The magnet frame provides for the flux of winding 14 two parallel paths, one being continuous and extending through the members 9, 6, 8 and 7, and the other being interrupted and extending through the members 9, 6, 13 and 7, this path having variable air gaps between the rotating armature member 13 and members 6 and 7. The armature member is biased by means hereinafter described to a position normally to introduce a given total air gap.

Movement of the armature member 13 is utilized to actuate an element 15 fixed intermediate of its ends to shaft 12 within a bracket 16 formed integrally with the aforementioned element 11, the shaft 12 extending through a portion 17 of the bracket parallel to and spaced from member 11. The element 15 which in practice may be a contact member is here utilized as a contact actuating member. It has fixed to one end thereof an insulating plate 18 to wedge between two normally engaging contacts 19 and 20 for disengagement thereof, being biased to so function by a coiled spring 21. Spring 21 has one end connected to a pin 22 adjustably carried by member 15 and has its other end connected to a pin 23 adjustably carried by a bracket on the magnet frame. The armature assembly inclusive of the member 15 is balanced and the spring biasing arrangement is such as to afford the spring characteristic hereinafter set forth. The spring biased movement of the element 15 and of the armature member to which it is connected through shaft 12 is limited by a stop 24 adjustably mounted on bracket 16, said stop cooperating with a washer 25 carried by element 15.

The relay structure described is fixed to an insulating supporting base 26, the contacts 19 and 20 heretofore referred to being respectively carried by long leaf springs 27 and 28 which are fixed to the base 26.

Figure 3:
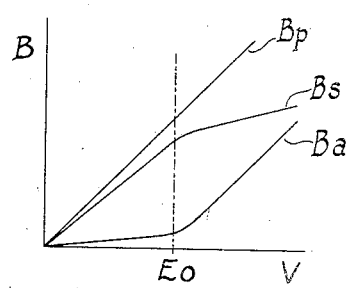
Figs. 3, 4 and 5 illustrate certain characteristic curves.

The principle of operation of this relay will now be explained, reference being had to Fig. 3 wherein the curve Bp depicts the relation between the voltage and flux in a non-saturated magnetic circuit when the voltage varies while the frequency remains constant, and this curve may be regarded as representing the flux in the member 9 of the magnet frame which member constitutes the core of winding 14. As hereinbefore indicated, the flux generated in member 9 divides, part taking the shunt path through the member 8 and the remainder taking the path through the armature member and air gaps between said armature member and the magnet frame. At low voltages and consequent low magnetization the reluctance of the shunt path is only a small fraction of the reluctance of the path through the armature member and thus nearly all of the flux initially takes the shunt path. As the iron in the shunt path becomes saturated upon increase in voltage, the shunt path takes very little of the additional flux, the major part of which takes the aramture path. This change in division of the flux is also depicted in Fig. 3 wherein curve Bs represents the flux in the shunt path, while the curve Ba represents the flux in the armature path. Thus it will be seen that after the voltage reaches a certain value Eo the flux taking the armature path increases at a much higher rate than does the flux taking the shunt path, wherefore the magnetic pull on the rotating armature member which is proportional to the square of the flux in the armature path then increases very rapidly with a slight increase in voltage. Hence when operating at this upper part of the magnetization curve the relay is very sensitive to voltage variations and is therefore especially adapted to use as a voltage regulator for alternating current circuits.

Figure 4:
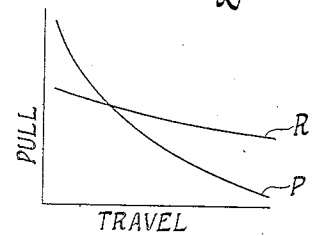
Figure 5:
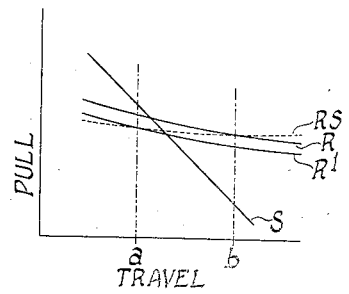

The rotating armature type of electromagnet herein disclosed has a flatter pull characteristic than the plunger type of electromagnet whereby there is less variation in pull for different positions of the armature than in the case of the plunger type of electromagnet. This difference in pull characteristic of the rotating armature type of electromagnet and the plunger type of electromagnet is depicted in Fig. 4 wherein P represents the pull curve of the plunger type, and R the pull curve of the rotating armature type. As hereinbefore stated, the armature is balanced and the biasing spring is shown arranged in such manner that the resulting torque within the range of movement of the armature closely approaches the magnetic torque as shown in Fig. 5, this being made possible by the aforementioned flat pull characteristic. In Fig. 5, R depicts the torque of the relay for a given voltage, while RS depicts the torque of the spring on the armature, S depicting the pull of the spring in terms of length. With the torque of the magnet as depicted by curve R the relay will be moved to closed position, whereas if the voltage decreases, lowering the torque of the relay to the value $R^1$, the spring torque throughout the operating range $a$—$b$ exceeds the torque of the relay, causing the relay to open. By correlating the spring characteristic with the torque characteristic of the magnet the relay may be so designed that it will work positively on very small variations in voltage. The variation of the torque characteristic of the spring relative to the magnet torque characteristic obviously may be altered by changing the angular relation between the armature member and the center line of the spring.

An additional advantage of the rotating armature type of relay is that it is possible to put a practically unlimited amount of weight into the armature, thus increasing its inertia and making it immune to mechanical shocks and slow to respond to fluctuations in magnetic pull.

The long leaf spring support of the contacts has been found very effective in preventing separation of the contacts by mechanical shocks, whereas the insulating wedge insures against accidental engagement of the contacts while the relay is deenergized.

While the relay selected for illustration is primarily a voltage relay for alternating current circuits, it will be understood that it is also adapted to use as a current relay and that a relay of the general design herein set forth may be used as either a voltage or current relay for direct current circuits.

What we claim as new and desire to secure by Letters Patent is:

1. A relay comprising an exciting winding, a magnet frame therefor having a balanced rotating armature, said frame affording for the flux of said winding a path through said armature and a path shunting said armature to effect at certain excitations an increased variation in flux affecting the armature for a given variation in excitation, contacts having relatively long leaf spring supports biasing the same for engagement and means operable by said armature and comprising an insulating element to be introduced between said contacts for disengagement thereof while said armature is within a given part of its operating range.

2. A relay comprising an exciting winding, a magnet frame therefor having a balanced rotating armature, said frame affording for the flux of said winding a path through said armature and a path shunting said armature to effect at certain excitations an increased variation in flux affecting said armature for a given variation in excitation, contacts having relatively long leaf spring supports biasing the same for engagement, means operable by said armature and comprising an insulating element to be introduced between said contacts for disengagement thereof while said armature is within a given part of its operating range, and a spring for biasing said armature to disengage said contacts, said spring having a pull curve closely approaching the pull curve of said relay.

3. A single winding relay comprising a winding, a magnet frame affording for the flux of said winding parallel magnetic paths which, within a working range, differ in rate of reluctance variation with the relation of the two rates of reluctance variation reversing within said working range, one of said paths being substantially continuous and having its component parts in a fixed relation and the other being interrupted, and a balanced rotating armature member included in the latter path and providing with said frame an air gap which varies with the rotation of said armature and which affords a magnetic torque thereon which tends to approach zero value as said armature is rotated toward a position of minimum air gap, the direction of said torque being opposite to the direction of displacement of the armature from said zero torque position.

4. A single winding relay comprising a winding, a magnet frame affording for the flux of said winding parallel magnetic paths differing in rate of reluctance variation through a working range with the relation of the two rates of reluctance variation reversing within said working range, one of said paths being substantially continuous and the other being interrupted, and a balanced rotating armature member having parts extending oppositely from its pivot included in the latter path and providing with said frame an air gap which varies with the rotation of said armature and which affords a magnetic torque thereon which tends to approach zero value as said armature is rotated toward a position of minimum air gap, the direction of said torque being opposite to the direction of displacement of the armature from said zero torque position.

5. A single winding relay comprising a winding, a magnet frame affording for the flux of said winding parallel magnetic paths differing in rate of variation of reluctance within a working range with the relation of the two rates of reluctance variation reversing within said working range, one of said paths being substantially continuous and having its component parts in a fixed relation and the other being interrupted, a balanced rotating armature in the latter path arranged to continuously provide an air gap in said path which varies with the rotation of said armature and which affords a magnetic torque thereon which is opposite to the direction of displacement of the armature from a given position wherein said air gap is of minimum value, and a biasing spring for said armature adapted to oppose said magnetic torque.

6. A single winding relay comprising a winding, a magnet frame affording for the flux of said winding parallel magnetic paths differing in rate of variation of reluctance within a working range with the relation of the two rates of reluctance variation reversing within said working range, one of said paths being substantially continuous, the other being interrupted, a balanced rotating armature in the latter path arranged to provide therein an air gap at each end of said armature in all angular positions of the latter, and a biasing spring for said armature having a torque-curve closely approaching the armature-pull curve of said relay.

7. A single winding relay comprising an exciting winding, a magnet frame therefor having a balanced rotating armature providing with said frame an air gap of at least a predetermined minimum value at each end of said armature in all angular positions of the latter, said frame affording for the flux of said winding a path through said armature and a path which has its component parts in a fixed relation and which shunts said armature to effect at certain excitations an increased variation in flux affecting the armature for a given variation in excitation, contacts controlled by said armature and spring means biasing said armature to cause said contacts normally to assume a given relation, said armature being adapted upon rotation thereof against the bias of said spring means to provide for relatively small variations in the reluctance of said first mentioned path, for the purpose set forth.

8. A single winding relay comprising an exciting winding, a magnet frame therefor having a balanced rotating armature providing with said frame an air gap of at least a predetermined minimum value at each end of said armature in all angular positions of the latter, said frame affording for the flux of said winding a path through said armature and another path which has its component parts in a fixed relation and which shunts said armature to effect at certain excitations an increased variation in flux affecting the armature for a given variation in excitation, contacts controlled by said armature, and spring means biasing said armature to cause said contacts normally to assume a given relationship to each other, said spring means providing an armature-restoring curve closely approaching the armature-pull curve of said relay, to thereby provide for relatively large angular motion of said armature in response to small variations in the excitation of said winding.

9. A single winding relay comprising an exciting winding, a magnetic frame therefor having a balanced rotating armature, said frame affording for the flux of said winding a path through said armature and another path which has its component parts in a fixed relation and which shunts said armature to effect at certain excitations an increased variation in excitation, the arrangement being such that at the working excitation the second mentioned flux path is substantially saturated, the arrangement further being such that the length of the air gap in said first mentioned path is maintained of at least a predetermined minimum value in all angular positions of the armature, a pair of contacts resiliently biased into engagement with each other, means for subjecting said contacts to control by said armature, spring means for biasing said armature in a direction away from said contacts to normally permit engagement of the latter, the bias of said spring means providing an armature-restoring curve closely approaching the armature-pull curve of said relay, to thereby provide for relatively large angular motion of said armature in response to small variations in the excitation of said winding.

10. A single winding relay comprising an exciting winding, a magnetic frame therefor having a balanced rotating armature, said frame affording for the flux of said winding a path through said armature and another path which has its component parts in a fixed relation and which shunts said armature to effect at certain excitations an increased variation in flux affecting the armature for a given variation in excitation, the arrangement being such that at the working excitation the second mentioned flux path is substantially saturated, the arrangement further being such that the length of the air gap in said first mentioned path is maintained of at least a predetermined minimum value in all angular positions of the armature, spring means for biasing said armature in a given direction, the bias of said spring means providing an armature-restoring curve closely approaching the armature-pull curve of said relay, to thereby provide for relatively large angular motion of said armature in response to small variations in the excitation of said winding.

EDWIN W. SEEGER.
GLENDON C. BROWN.
FRANK J. RUSSELL.